May 11, 1937.   R. CHILTON   2,079,680

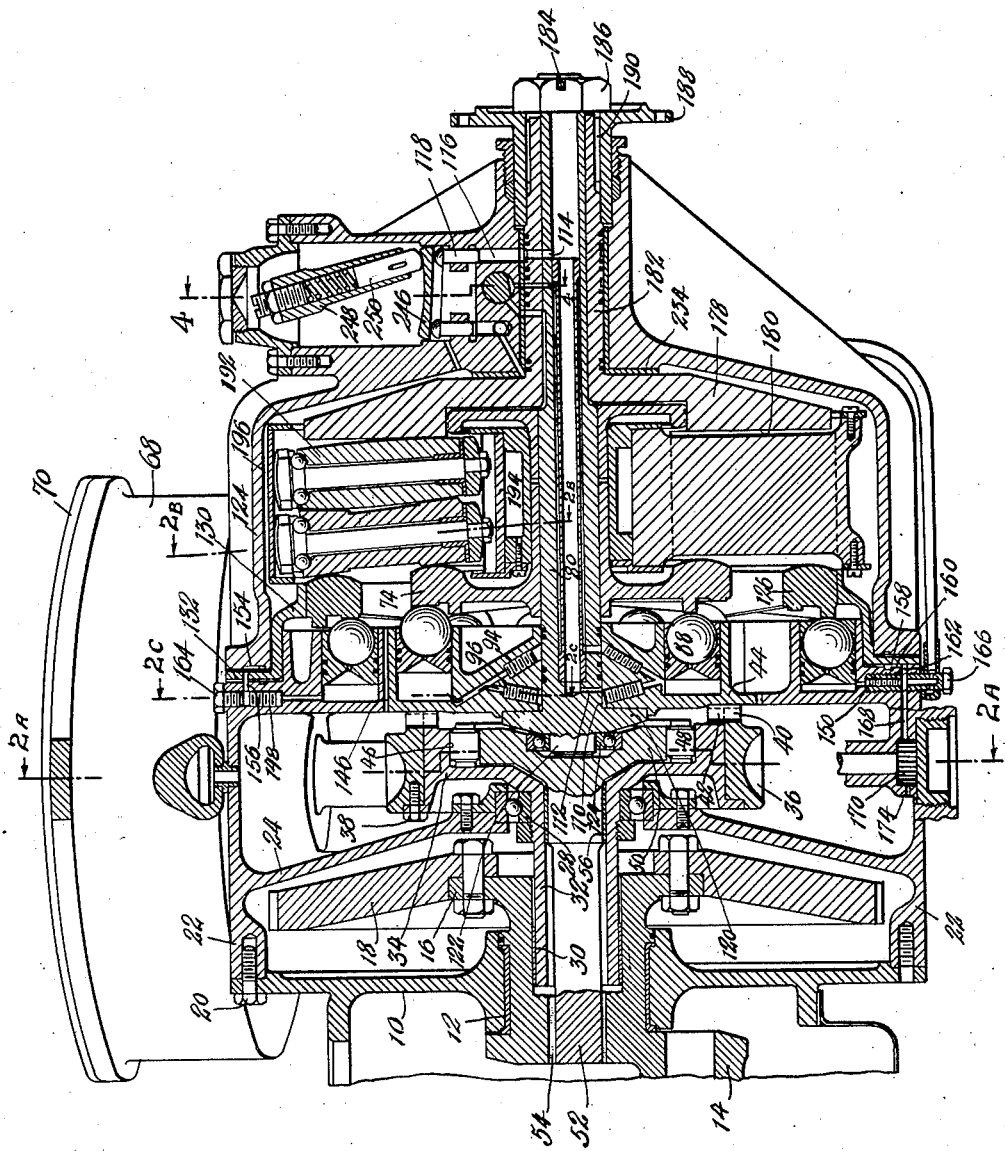

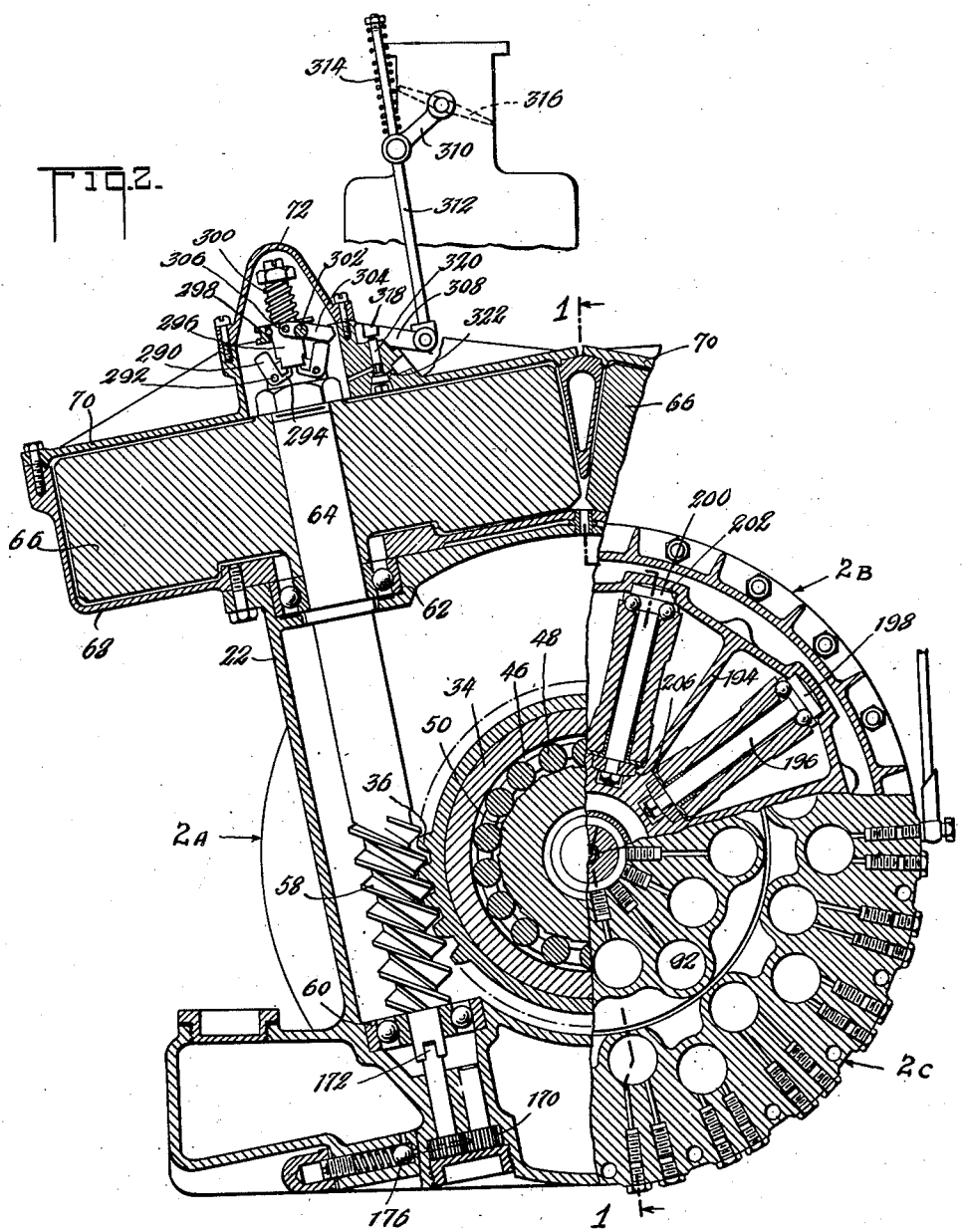

TRANSMISSION

Filed Sept. 5, 1934   5 Sheets-Sheet 3

INVENTOR
ROLAND CHILTON
BY
ATTORNEY

May 11, 1937. R. CHILTON 2,079,680
TRANSMISSION
Filed Sept. 5, 1934 5 Sheets-Sheet 4

INVENTOR
ROLAND CHILTON
BY
ATTORNEY

May 11, 1937.  R. CHILTON  2,079,680
TRANSMISSION
Filed Sept. 5, 1934  5 Sheets-Sheet 5
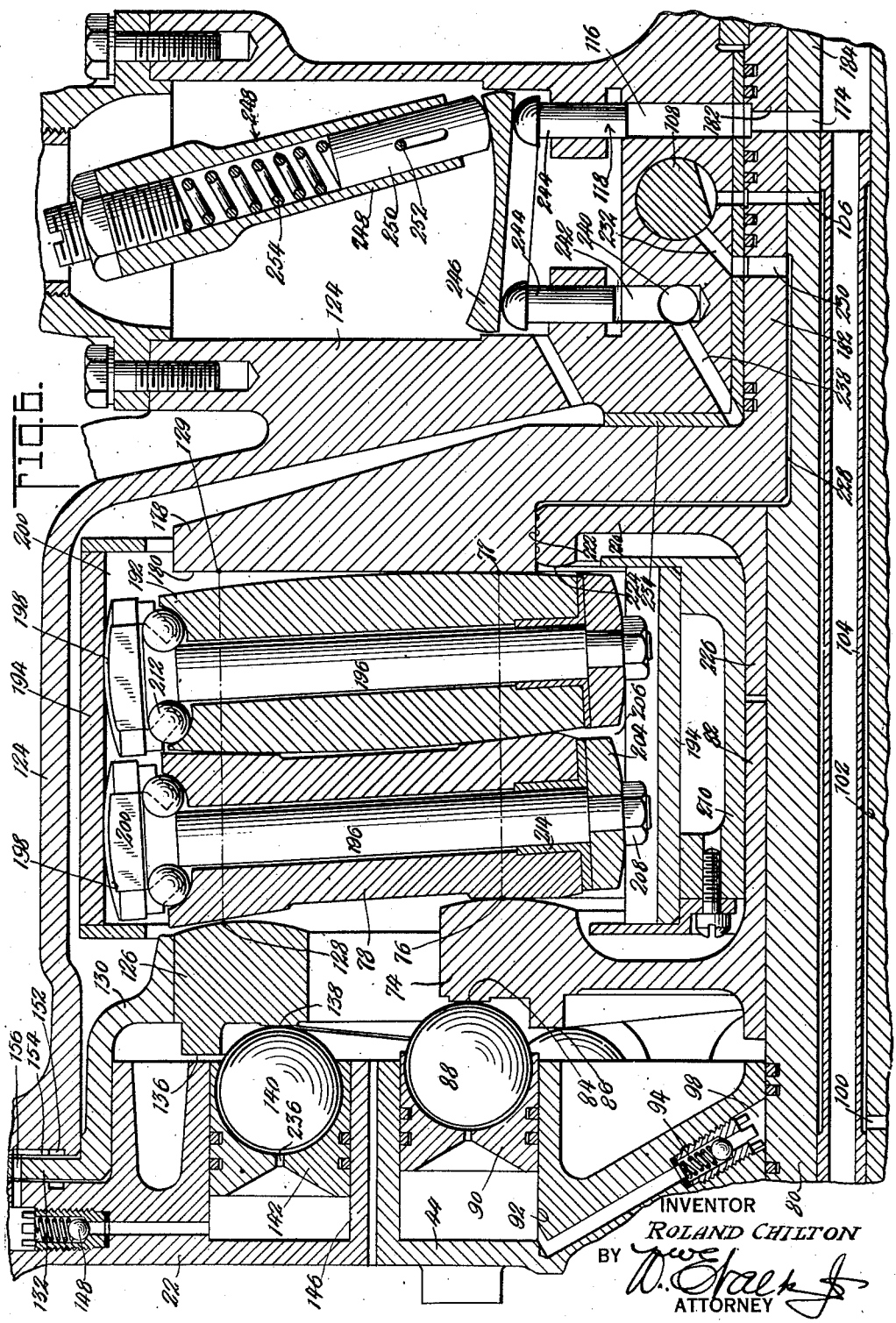
INVENTOR
ROLAND CHILTON
BY
ATTORNEY Patented May 11, 1937

2,079,680

UNITED STATES PATENT OFFICE 2,079,680

TRANSMISSION

Roland Chilton, Ridgewood, N. J.

Application September 5, 1934, Serial No. 742,751

42 Claims. (Cl. 74—281)

My invention relates to variable speed transmissions of the type wherein smooth driving members are loaded into non-slipping rolling driving contact, and in certain aspects may be said to constitute a continuing development of that type of transmission described and illustrated in my copending applications, Serial Numbers 669,144 filed May 3, 1933, now Patent #2,040,830, and 728,058 filed May 29, 1934.

In the embodiment of the invention selected for illustration, a transmission suited to automotive used and having a ratio range of from one-to-one to one-to-zero and therebeyond into reverse, is shown. The transmission can be used either independently of or in association with a regenerative transmission system generally similar to that described and illustrated in my co-pending application Serial Number 732,182, filed July 21, 1934, as desired.

Transmissions of the type herein set forth are designed and intended to operate under lubricated conditions, and large contact pressures relative to the driving effort transmitted are required to prevent slippage between certain of the contact parts. It is accordingly an object of the present invention to provide a transmission wherein the contact loads at the various driving contacts are at all times proportional to the driving load at each contact.

A further object of the invention is to provide a transmission wherein backlash is automatically taken up even under a sudden reversal of the driving load. In contact pressure means of the prior art, objectionable backlash in the drive has been found to exist in certain cases.

Other and further objects of the invention are:
(1) To provide a transmission wherein the parts may be moved for ratio change without disturbing the desired relation between the driving and contact pressures at the various member contacts;
(2) to provide a transmission wherein the contact loads are maintained in the desired proportion to the driving effort at each contact, despite (a) changes in driving radius, (b) relative movement of parts, (c) change in ratio, (d) wear, (e) reversal of driving effort, and (f) reversal of direction of rotation; (3) to provide a transmission wherein hydraulic means are utilized to compensate for (a), (b), (c), (d), (e) and (f) above;
(4) to provide a transmission wherein the contact pressure reactions are opposed by hydraulic means to the elimination of heavily loaded thrust bearings which, in certain transmissions of the prior art, have been a source of frictional losses;
(5) to provide a transmission wherein the contact pressure generating means is regulated to comprise a servo ratio control means whereby the control effort required is reduced to a mere finger pressure; (6) to provide a transmission wherein a quickly adjustable pre-loading means is provided; and (7) to provide a transmission wherein the parts are automatically freed for unitary rotation when the one-to-one, i. e., "direct drive in high", ratio is obtained.

Still other objects and advantages of the invention will be obvious from the ensuing description and will be hereinafter set forth.

The driving connection of certain of the members with their associated parts comprise hydraulic pumps, here illustrated as of the cam operated multiple cylinder type having automatic one-way delivery and inlet valves. The members connected by these torque transmitting pumps are organized for relative creepage under leakage in the system, and, by the pumping action under this creepage, the entire system is automatically maintained full of fluid which is thus automatically induced as needed to keep the parts to zero backlash.

Each system, comprising a torque responsive pump and its associated contact pressure pistons, is provided with a pressure control relief plunger; the plungers being restrained by a balance beam having a movable fulcrum, which movement comprises the ratio control means of the transmission, since the position of the fulcrum along the balance beam with respect to the relief plungers determines the relative hydraulic pressures on the respective members, and therefore determines their relative position in the ratio change.

Since the pumps constitute the power transmitting driving connections between certain of the drive members and their respective drive shafts or anchorages, the hydraulic pressure generated by each pump is at all times proportional to the driving load on the member in question. The control means merely determines the proportion between the pressures in the respective hydraulic systems; the gross pressure on each being under all conditions proportional to the driving effort on the associated drive member.

It will be appreciated that when a multiple piston pump having automatic valves is organized to comprise a drive connection between a shaft and drive member free from relative rotation or creepage, some of the pistons will be on their delivery strokes, and therefore generating hydraulic pressure proportional to the driving loads, while other pistons will be on their inlet strokes inducing fresh fluid and free from driving load.

The effect of sudden reversal in direction of the driving load is suddenly to reverse the direction of creepage and therefore of piston movement, whereby the pistons which were creeping on their delivery and suction strokes, respectively, instantly reverse their roles by virtue of the automatic action of the one-way valves. In the preferred embodiment of the showings the suction valves of all the cylinders are supplied with relatively low primary pressure from a primary pump, and sudden reversal of driving effort is hydraulically cushioned against backlash.

It will be noted that, in this servo system, such power as is required to effect the ratio change is derived from the slow creepage between the shafts and the associated drive members which is engendered by the displacement of the pumps due to leakage or control movement, and also by the slight loss of fluid which occurs at the pressure proportioning control valves.

In the drawings, wherein like reference characters denote like and corresponding parts:

Fig. 1 is a longitudinal section on the line 1—1 of Fig. 2;

Fig. 2 comprises fragmentary transverse sections as follows:

The left hand part of this figure, 2a, is a transverse section on the line 2a of Fig. 1;

The upper segment 2b is a transverse section on the line 2b of Fig. 1; and

The lower segment 2c is a transverse section on the line 2c of Fig. 1.

Fig. 6 is a duplication of part of Fig. 1 on an enlarged scale.

Figure 4:
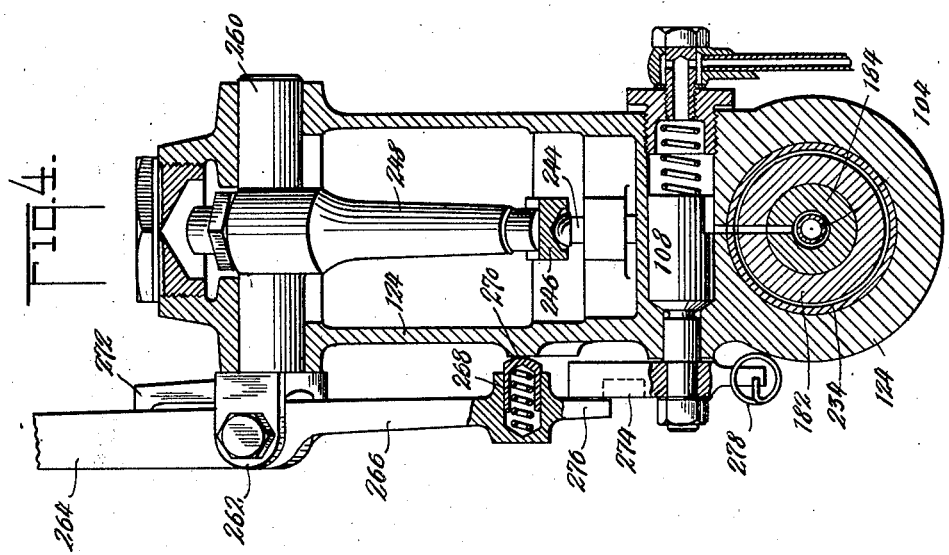
Fig. 4 is a fragmentary sectional view through the housing on the line 4—4 of Fig. 1.

Referring first to Fig. 1, 10 designates the end of a conventional engine crankcase having a bearing 12 supporting a crankshaft 14 equipped with a flange 16 to which is bolted a light engine flywheel 18 in the usual way.

Secured to the crankcase 10, as by studs 20, is a front housing 22, having a wall 24 supporting a bearing 28. Supported for free rotation in the bearing 28, and in a bushing 30 in the crankshaft 14, is a sleeve 32 integral with a hub member 34, which carries a worm wheel 36, secured by screws 38. Both the hub 34 and the worm wheel 36 are provided with driving lugs 40, 42, engaging common lugs on a driving member assemblage 44, later to be described.

The hub member 34 (see also Fig. 2) is provided with a smooth bore or race-way 46 engaging rollers 48 which in turn engage a cam portion 50, which is integral with a drive shaft 52 splined into the crankshaft 14 as indicated at 54. The shaft 52 is rotationally supported within the sleeve 32 by a bushing 56. It will be seen that the worm wheel 36 and the hub member 34, with its sleeve 32, are free for rotation relative to the crankshaft while the cam member 50 is permanently connected for rotation with the crankshaft by the spline 54.

The cam surfaces 50 and the rollers 48 cooperate with the track 46 to comprise a one-way drive clutch of the well known roller type, whereby the worm wheel 36 is driven from the engine, but which permits continued independent rotation of the worm wheel when the engine is slowed down.

Meshed with the worm wheel 36 are a pair of worms, one of which is shown at 58, Fig. 2a, and each worm is supported on suitable bearings 60, 62, in the housing 22, each worm shaft being extended through its bearing 62 at 64, and to each extension there is secured a massive flywheel 66 covered by a housing 68 and cover plate 70 which in turn carries the housing 72 of a governor.

The driving or power input member of the transmission designated as 74, has a crowned contact face 76 drivably engaging planetary rollers 78, later to be described. The driving member 74 is rotationally supported upon a main shaft 80 by a sleeve 82 and is equipped with double inclined cam tracks 84, 86, arranged so that the high points of the inner cams 86 are opposite the low points of the outer cams 84.

Engaged with the cams 86, 84 are balls 88 seated in plungers or pistons 90 slidable in cylinders 92 formed in the member 44 which has already been described as having lugs engaging the lugs 40, 42, whereby the hydraulic cylinder member 44 at all times rotates with the worm wheel 36. In Figure 2c it will be noticed that the cylinders 92 are alternately offset so that the associated balls 88 alternately engage the inner cams 86 and the outer cams 84 as shown.

Communicating with each of the cylinders 92 is a non-return inlet valve 94, and a non-return delivery valve 96. All of the inlet valves 94 communicate with a groove 98 which in turn communicates, through a radial hole 100 in the shaft 80, with an annular duct 102 formed between the bore of the shaft 80 and an oil tube 104. At the right hand end of this annulus will be seen a radial hole 106 communicating with a reverse control valve 108.

All of the delivery valves 96 communicate with an annular chamfer 110, and through a hole 112, connect with the bore of the tube 104, whence a radial hole 114 communicates with the bore 116 of a ratio control valve 118.

The main shaft 80 is provided with a thrust disc 120 engaging a companion thrust face on the hydraulic driving member 44, and has a pilot 122 by which the left hand end of the main shaft 80 is supported by a bearing 124 in the clutch cam member 50.

The normally fixed or reaction member of the transmission is shown at 126 and comprises a ring having a crowned face 128 contactable with the rollers 78. The ring 126 is supported for rotational creepage in a support member 130 which has a flange 132 pinched between the front housing 22 and the rear housing 124, as shown in Figs. 1 and 6. The reaction ring 126 is provided with cams 136, 138, similar to those already described on the driving member 74, and engaging these cams are balls 140 seated in plungers or pistons 142 slidable in cylinders 146 formed in the housing 22. Each cylinder is provided with delivery valves 148 and inlet valves 150, and all the delivery valves are connected together by a common groove 152 (see Fig. 6), formed in the flange face of the housing 124, the individual connections being established by short radial grooves 154 connecting with drill holes 156. Similarly, all of the inlet valves 150 are connected to a second common groove 158 formed in the flange face of the housing 22, the individual connections being by way of short radial grooves 160 communicating with individual holes 162.

The bores in which the valves are seated are closed by suitable screw plugs 164, and, since the grooves already described connect together all the inlet valves into one system and all the delivery valves into another system, it will be obvious that either system may be tapped into by removing an appropriate plug 164 and substituting a suitable connection, such as that indicated at 166 which, in this case, connects to all of the inlet valves 150.

Since a connection made to one inlet valve connects all of them, they are all served with primary pressure from a single hole 168 communicating with the delivery side of a primary gear pump 170 driven from the bottom of the worm 58 as indicated at 172. The inlet for this pump is indicated at 174 (Fig. 1) as communicating with an oil sump comprised within the housing 22, and the pump 170 is additionally provided with an adjustable spring loaded relief valve 176 whereby the pressure generated by the pump may be regulated in the usual way.

It should now be clear that the reaction member 126 is backed up and rotationally restrained by the cams 136, 138 engaging the balls 140 seated in the pistons 142 slidable in the fixed cylinders 146, and that, similarly, the driving member 74 is both backed up and driven by the cams 84, 86 engaging the balls 88 of the pistons 90 slidable in the rotating cylinders 92 formed in the member 44 which is driven from the engine as previously described, and is in turn backed up by the thrust disc 120 of the main shaft 80. Each of these systems comprises an hydraulically compensated torque responsive driving and loading means for the associated member, (which is free for rotational creepage relative to the associated cylinder member).

For example, if it is necessary, in order to prevent slippage at the rolling driving contacts, that the contact pressures be twenty times the tangential driving effort to be transmitted, then the cams 136, 138, 84, 86, will be given a slope of one-in-twenty. Under relative creepage, alternate pistons will be moving on their inlet and delivery strokes respectively, the inlet strokes being followed up by oil pressure from the primary pump 170, and the delivery strokes being resisted by the resistance of the entire delivery stems to leakage (subject to modification by the control system later to be described).

It will be clear that the pressures generated by the cams on those pistons which are on their delivery strokes is at all times proportional to the driving load on the respective associate members, and that any bodily outward axial movement of one of these members will be automatically followed up by oil from the primary pressure pump as each piston assumes its inlet stroke. Such axial movement of these members may be accordingly controlled by controlling the proportionate pressures in the respective systems. Such pressure ratio control may be effected either in the primary or low pressure inlet systems, or in the high pressure or delivery systems, or in both. In the specific embodiment of the drawings the control is effected in the delivery or high pressure systems, but the invention is not limited to this particular convenient organization.

Before describing the control system, the speed ratio changing organization will be recapitulated although it is broadly similar to that already described in said co-pending applications, Serial Numbers 669,144 and 728,058.

Opposed to the driving member 74, and the reaction member 126 is a driven member 178 which, in this particular embodiment, has a flat face 180, and is integral with a sleeve 182 bored to accommodate an extension 184 of the main shaft 80 on which the driven member is secured by a thrust nut 186 which also clamps a propeller shaft flange 188, which is splined to the driven member sleeve 182 at 190.

Drivably engaged between the driving member 74 and the reaction member 126 on the one hand, and the driven member face 180 of the driven member 178 on the other, are contacting planetary rollers 78, 192, rockably supported in a cage 194 on spindles 196 having outer integral spherical heads 198 which have flats 200 (Fig. 2b) to slide in appropriate grooves 202 formed in the cage 194. The inner ends of the spindles 196 are provided with spherical washers 204 having similar flats engaging inner grooves 206, in the cage 194, and secured by nuts 208 to the spindles 196.

It will be seen that the rollers 192, are barrel-shaped for rocking action to shift their points of contact radially across the face 180 of the driven member. The cage 194 is free for rotation on a bushing 210 on the sleeve 82, of the driving member 74. The centrifugal load from the rollers 78, 192, is taken by ball bearings comprising balls 212, engaging suitable race-ways formed under the spindle heads 198 and in the rollers 78 and 192; the inner ends of these rollers being provided with bushings 214.

As described in said co-pending applications, contacting planetary rollers such as shown have equal peripheral velocities at corresponding points. For example, the contact point of the roller 78 with the driving member 74, indicated at 76, and the complementary point of contact between the roller 192 and the driven member face 180, indicated at 77, necessarily have the same velocity of motion, regardless of the speed of planetization of the rollers. The transmission has been drawn in this high gear position whereat the following conditions obtain.

The entire contact load, and the entire driving effort are concentrated at the inner points of roller contact 76, 77, and accordingly the driven member 178 is held to unitary rotation with the driving member 76, regardless of the speed of planetization of the rollers with the cage 194, and there are no contact pressures, or driving reactions, between the outer end of the roller 78 and the reaction member 126 which have accordingly been drawn as out of contact.

A reservation is necessary as to this last statement inasmuch as the low primary pressures acting on the pistons 142 would tend to maintain the reaction member in light contact, in spite of the fact that there is no torque reaction from the member 126 through its cams 136, 138, on the pistons 142. Accordingly, it may be desirable to duplicate the control mechanism (later to be described) so as to be also effective on the primary system, or to arrange other means for shutting off the primary pressure from the pistons 142 when this one-to-one position is obtained, and suitable means for doing this have already been included in said co-pending applications.

The object of so relieving the reaction member contact 128 from incidental primary pressure is to permit the planet cage 194 to rotate at unitary speed with the remainder of the parts, in accordance with the inherent characteristics of this organization. This automatically gives "direct drive in high" without resource to direct drive clutches or other added mechanisms.

It will now be clear that, should hydraulic pressure be admitted to the reaction member pistons 142, the rollers will be rocked away from the one-to-one ratio position shown, the contact points moving outwardly along the driven disc face 180, and should the entire hydraulic pressure be controlled to devolve exclusively upon the reaction member contact 128, then the contact on the driven member face 180 will fall at the complementary point 129 which then has the same (zero) velocity as the reaction member 126, and hence the driven member will be held to zero speed, regardless of the speed of planetization of the rollers. Incidentally, in the case where the diameters of the driving member contact 76 and the reaction member contact 128 have a two-to-one ratio (as approximately shown) then the cage will planetize backwards at driving member speed so long as non-slipping contact is maintained at the points 76 and 128.

In any transmission having a reaction member, a driving member and a driven member, the torque on the driven member is the sum of the torques on the driving member and the reaction member, when in any forward drive ratio. It is a feature of the organization shown that the contact pressure on the driven member is also the sum of the contact pressures on the reaction member and driving member. It is also a feature of this organization that, as the contact point moves across the face of the driven member along the contacting roller, the proportions between the torques devolving on the driving member and the reaction member is the same as the proportion of the contact loads on these members, as will be obvious by considering the roller assemblage as a beam loaded at respective ends by the driving member and the reaction member, and having a fulcrum movable between these ends, said fulcrum comprising the rockably shiftable contact on the driven member.

It has already been seen that, due to the equal effective slopes of the cams on the driving and reaction members, the contact pressure on each is at all times proportional to the respective torques, wherefor, the entire system is in stable equilibrium in all positions of contact, from the one-to-one ratio point 77 where the torque and contacts load on the driven member react equally and exclusively on the driving member; to the one-to-zero ratio point 129 where the torque and contact loads of the driven member react in full upon the reaction member (except for incidental loads on the driving member due to frictional resistance). It should be obvious that these two conditions are those appropriate respectively to one-to-one and one-to-zero ratios, and that, in the midway position, the contact loads on the reaction and the driving members are each equal to one half of the contact load on the driven member, and that the forward torque on the driving member and the backward torque reaction on the reaction member give double torque (at one half speed) to the driven member.

Beyond the points 77 and 129 these relationships cease to be true (with the specific roller profiles shown) and the contact could not be taken beyond the zero ratio point 129 by increase in hydraulic pressure on the reaction member pistons 142. Accordingly, in order to provide for reverse ratios, the contact is carried beyond the point 129 by means of a floating piston 220 (see Fig. 6) engaged in a shallow cylinder 222 in the driven member 178, which piston has a rim 224 contactable with the inner ends of the rollers 192, the piston 220 being freely rotatable on the main shaft 80 on a piston sleeve 226. Hydraulic pressure is fed to this piston through a groove 228 in the main shaft extension 184 which groove communicates with a hole 230 through the driven member sleeve 182, and by the hole 232 to the reverse valve 108.

The very high thrust to which the driven member 178 is subject is taken on a plain flat thrust washer 234 (Fig. 6), which, with ordinary methods of lubrication, would be considered entirely impracticable, particularly as friction losses at highly loaded thrust bearings have detracted from the efficiency of many rolling contact transmissions in the prior art. However, one of the important features of this invention resides in the novel means of hydraulically floating the thrust bearings, including the driven member bearing 234 under discussion, the main shaft thrust disc 120, and the piston rollers 88 and 140. The loads on each of these thrust bearings is hydraulically generated; the load on each of the balls 140 and 88 being equal to the load on each of the associated pistons 142 and 90. Similarly, the load on the thrust disc 120 engaging the thrust face of the member 44 is at all times equal to the gross effective load generated by all the pistons 90 and lastly the load on the driven member thrust face 234 is equal to the gross effective load generated by the reaction member pistons 142. While these loads vary continuously, their reactions on the associated members must be at any instant equal to the instantaneous load as stated.

Taking the balls 140, for example, it will be noted that their diameter is slightly less than the diameter of the associated pistons, wherefore the effective bearing area of the ball is slightly less than the effective hydraulic area of the piston. Thus the specific intensity of pressure on the bearing surface of the ball against the piston is slightly greater than the hydraulic pressure on the piston. Each piston is provided with a small hole 236 whereby the oil pressure on the piston is communicated to the bearing surfaces, which pressure is just insufficient to lift the ball from its seat, but which leaves only a small balance of oil film pressure to be built up by rotation of the ball (in accordance with the well-known action of lubricated sliding surfaces) in order to establish complete film lubrication.

In the same way, all the delivery valves 96 of the driving member pump cylinders 92 deliver to the chamfer 110, within the thrust bearing 120. Here again the area of the bearing surface is made slightly less than the total area of the pistons 90 which are effective at any one time, and hence this hydraulic pressure alone, just fails to establish an oil flow separating the thrust face 120 from the companion face of the member 44, leaving a small balance of oil film pressure to be generated by relative rotation. Referring now to the driven member thrust bearing 234, there will be noted an oil hole 238 in the housing 124 communicating with a transverse hole 240 which is connected by a pipe (not shown) with the delivery valves 148 of the reaction member cylinders 146. Here again the area of the thrust face 234 is made slightly less than the net effective area of the pistons 142 by which the load on this face is generated, and accordingly this bearing is also hydraulically floated as soon as rotation slightly augments this almost-load-balancing-pressure.

The control system is as follows:

A hole 242 (Fig. 6) connects with the hole 240, which has already been described as subject to delivery pressure from the reaction member pistons, just as the companion hole 116 has already been described as connected to the delivery valves of the driving member cylinders 92. These holes are equipped with similar relief valves or plungers 244 with which is rockably engaged a balance beam 246 having an arcuate upper face against which a swinging control lever 248 comprises a movable fulcrum, which may include a spring loaded plunger 250 in order to protect the entire transmission system from overload. Except under such abnormal conditions the plunger 250 is maintained rigidly against a stop pin 252 by a spring 254.

It will be seen that the transmission includes two complete hydraulic systems, one comprising the reaction member restraining and loading means, and one comprising the driving member driving and loading means, hence the contact loads on these members must bear the same relation as do the hydraulic pressures in the respective systems. This relationship is controlled through the relief plungers 244 which permit pressure to escape from the holes 242, 116, until the relationship of pressure in the two systems is that set by the position of the movable fulcrum of the balance beam 246 comprised by the control lever 248. For instance, in the position shown it is obvious that the entire restrain of this control lever 248 is upon the right hand plunger which will accordingly seal the escape hole 116 of the driving member system, while the left hand plunger is free of all restrain thus completely uncovering the hole 242 of the reaction member system, whereby this system is relieved of pressure. It should be clear that, in the middle position of the control lever 248, the beam 246 will balance the pressures in the two systems to equality. It should be obvious also that the movement of the contact point of the rollers 192 between the points 77 and 129 on the driven member must exactly follow the movement of the control lever 248 from one relief valve to another. In short, the equilibrium point of the rollers in their rocking action depends upon the relation between the hydraulic pressures in the driving and reaction member systems, this relation being set and controlled by the position of the control lever along the balance beam 246.

It should be noted, moreover, that only the relation of these pressures are so controlled, and that the gross pressures will vary with each variation in load transmitted, but without changing the proportion dictated by the control, and therefore without affecting the rocked position of the rollers whereby the transmission is stable in any ratio regardless of changes, or reversal, in the torque transmitted.

In the single primary pump system shown, the relief valve 176 may be set for a light pressure sufficient to overcome the resistance of the inlet valve springs; to maintain the pistons 90 and 142, lightly in contact with the cams during each inlet stroke, and to ensure a complete filling of each cylinder with air-free oil. However, when it is desired to pre-load the transmission members, the primary pumps may be duplicated and the relation between the pressures in the two primary systems may be controlled by duplicating in those systems, the relief valve plungers and moving-fulcrum beam control already described in connection with the high pressure or delivery systems. Alternatively, the control may be exclusively effective at the primary systems, since the novel hydraulic driving and loading means for the reaction and driving members of this invention automatically maintains the rollers in stable equilibrium in any position in which they may be set, as by the primary pressure relation.

Figure 3:
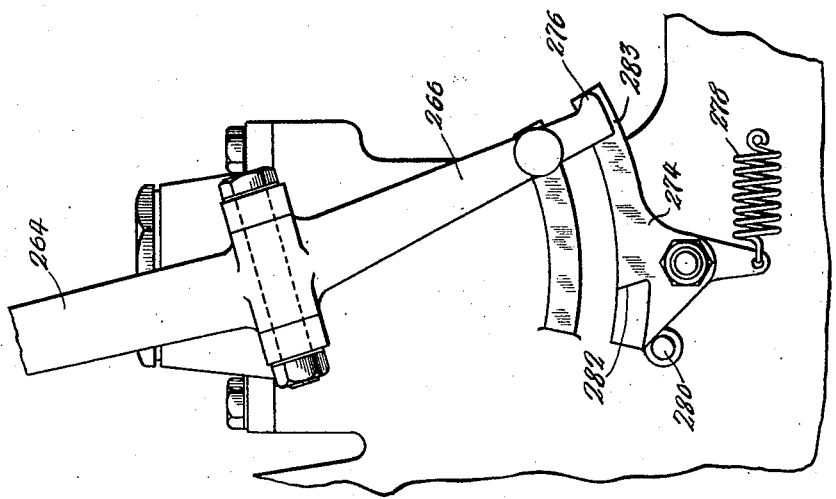
Fig. 3 is a fragmentary side elevation of the control lever mechanism.
Figure 5:
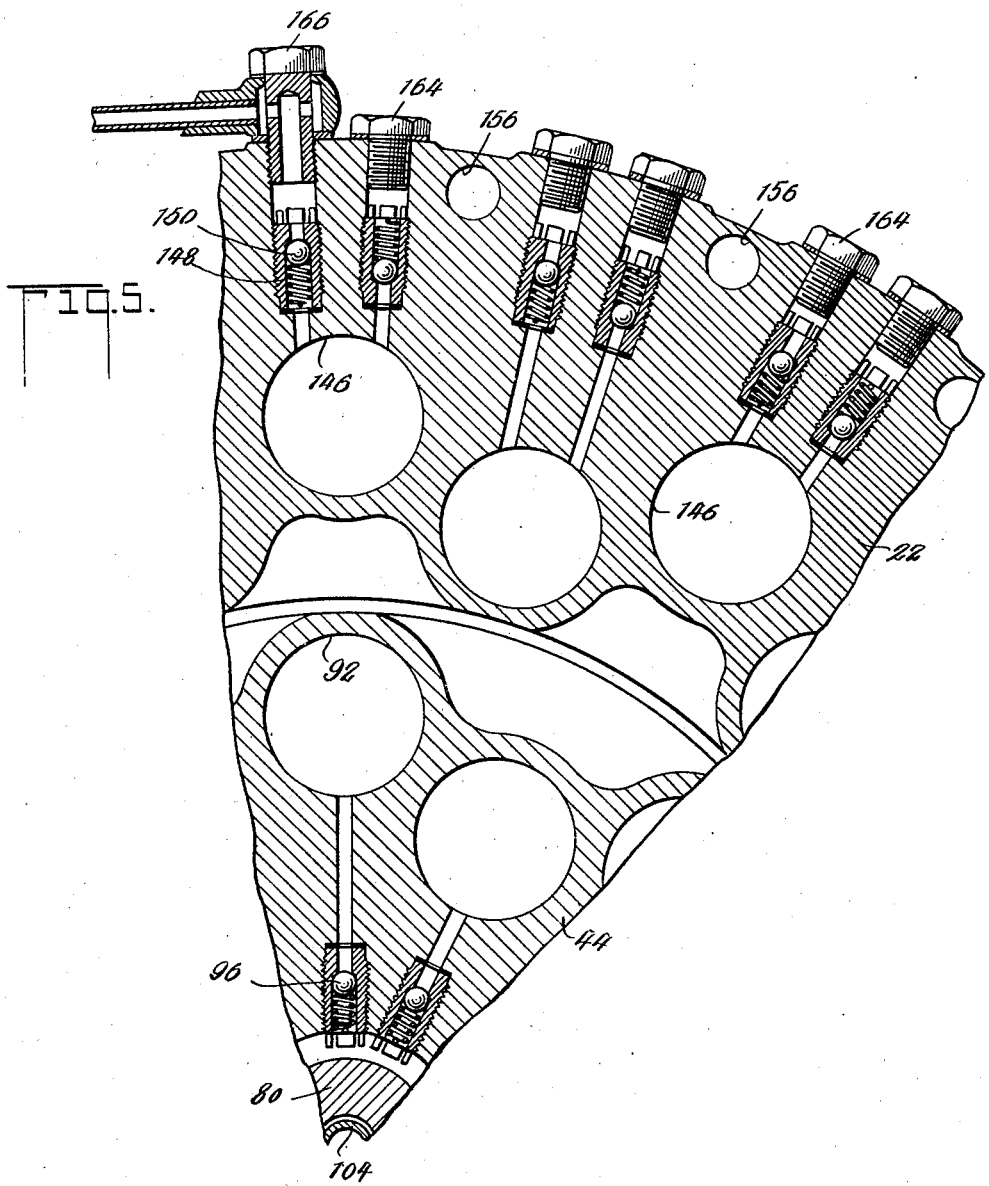
Fig. 5 is an enlarged fragmentary section on the line 2c of Fig. 1.

Referring now to Figs. 3 and 4, it will be seen that the control lever 248 is integral with a rock shaft 260 having a jaw 262 which carries for slight lateral rocking motion, an operator's control lever 264, which has a downward extension 266 carrying a spring loaded plunger 268, engaging a quadrant 270, on the housing 124, whereby the external control lever 264 is normally maintained against a stop 272. The reverse control valve 108 is provided with an exterior lever 274 which normally clears the bottom end 276 of the lever extension 266. In Fig. 3 the reverse valve lever 274 will be seen as provided with a spring 278 by which the lever is normally maintained in the position shown against the stop pin 280. An arcuate extension 283 of the reverse valve lever 274 prevents lateral motion of the control lever 264 until this is moved to the opposite extreme of its travel from that shown, whereupon the toe of the extension 276 will be opposite the face 282 formed by a depression in the lever 274. This is the zero ratio position of the control lever, and, in that position only, it may be rocked laterally against the resistance of the spring loaded plunger 268, thereby engaging the toe 276, with the face 282, so that, when the lever is moved back again from the zero ratio position, the reverse valve 108 will be rotated clockwise establishing communication with the hole 232 (Fig. 6) thus admitting primary pressure to the reverse piston 220 and thereby rocking the rollers beyond their zero ratio position, as previously described. At the instant of engagement of the reverse valve lever 274 the control lever 248 will be over the control plunger 244 which seals the reaction member system relief hole 242, but, as the control is moved back the lever 248 will move towards the other control plunger, and thus build up hydraulic pressure on the driving member system in the ratio appropriate for the reverse drive condition.

Suitable governor means are provided to open up the engine fully whenever the flywheel speed falls below a predetermined minimum, and to shut down the engine whenever the flywheels are energized to maximum speed. This mechanism may consist of weights 290 (Fig. 2) pivoted at 292 to the upper end of the flywheel shaft 64 and provided with lever arms 294 engaging a sleeve 296 carrying a ball bearing thrust collar 298 and loaded by a spring 300. Pivoted in the housing 72 on trunnions 302 is a rocking yoke lever 304 having pins 306 engaged in the groove of the collar 298. Extending from one of the trunnions 302, externally of the casing, is a lever 308 connected to the carburettor throttle lever 310 by a rod 312 and a spring 314. The parts are shown in the maximum flywheel speed position, whereat the throttle 316 has been closed by the governor. It will be noted that in this condition a projection 318 on the lever 308 is about to engage the end of the stem of a small valve 320. By means of a pipe (not shown) the hole 322 is in permanent connection with the primary pressure system and, should the flywheel be overspeeded, the next increment of movement of the governor lever 308 will open the valve 320, flooding the flywheel housing with oil. It is to be understood that very high peripheral speed will be used for the energy-storing flywheels and that the viscous drag of oil on the large surface area of these wheels at such extreme velocities will amount to a powerful braking effort. The flywheel speed will be of the order of ten times the maximum vehicle speed so that the braking effort available at the vehicle tires will be multiplied some ten times.

As an additional safety precaution against exceeding the high centrifugal stresses contemplated for the flywheels, this entire governor mechanism may be duplicated on the other flywheel and in addition manual controls may be provided whereby the operator may shut off the engine and flood the flywheel housing with oil in any emergency where the duplicate automatic safety devices should fail.

It should be understood that the kinetic energy-storing system of this invention may be used with any suitable form of variable ratio transmission, and that the preferred form of transmission shown comprises only a part of the present invention. However, the variable ratio transmission itself embodies many new and useful features and may be used wherever a variable speed drive is desired, this part of the invention not being limited to combination with flywheel energy-storing means.

The mode of operation of each unit of the complete transmission system having been covered in the foregoing description, it is only necessary to recapitulate the operation as a whole: The complete speed control of the vehicle is vested in the single ratio-control lever 264, the engine throttle being automatically controlled independently of the operator to maintain the flywheels energized between the prescribed speed limits. The usual clutch pedal is entirely deleted and the brake pedal may be relegated to merely emergency use. All normal retardations are accomplished by acceleration of the flywheels through the appropriate change in ratio.

The vehicle is brought to rest by progressively moving the single control lever to zero-ratio position; all of the energy abstracted from the vehicle being kinetically stored in the accelerated flywheels. However, after a stop of some hours' duration, the flywheels will come to rest whereupon the governor will leave the engine throttle wide open. For starting purposes only, a hand control (not shown) is incorporated whereby the throttle 316 may be held in starting position until the engine is sufficiently warmed up to permit full throttle opening, whereupon full engine torque will be available for acceleration of the flywheels. The kinetic storage capacity of these flywheels is so great as to absorb the entire output of the engine for several minutes before they are brought up to full speed, whereupon the throttle is automatically closed. As the control lever is moved away from zero ratio position the vehicle will be started and accelerated (at the expense of flywheel speed) and each subsequent deceleration, by progressive change in ratio towards the zero ratio end of the range, returns to the flywheel, by acceleration thereof, all the energy normally wasted in vehicle brakes.

Several very important characteristics inhere in the kinetic system of this invention. For instance, the rate of energy interchange between the vehicle and the flywheels is quite independent of the rate at which the engine is capable of energizing them. The acceleration and deceleration of the vehicle will follow, without lag, the rate of movement of the control lever, the only limitations being the physical strength and torque capacity of the transmission, the tractive capacity of the driving wheels, and the comfort of the passengers, for which reasons it may be desirable to incorporate means (not shown) to limit the rate of movement which the operator can enforce upon the control lever. Moreover, the time of abstraction of energy from the flywheels is independent of the time of their energization by the engine, and will in practice proceed indifferently while the engine is throttled down (by the governor after the flywheels have been brought up to their maximum speed and until they have been de-energized to their minimum speed by energy taken out for propulsion of the vehicle).

It will also be seen that, by this system, the power output capacity of the engine need only be adequate for the average demand, in contradistinction to conventional transmissions with which the engine must be large enough to meet the peak demand for optimum acceleration and hill climbing, which are the reasons for the present trend towards larger engines, which cannot in general be utilized to their full capacity for any protracted period without exceeding safe vehicle speeds. Current engines accordingly are operated at an average power output which is only a fraction of their maximum capacity, whereas, with the present invention, a much smaller engine may be used, which will, however, either be idling or operating at maximum output, and therefore at optimum efficiency. For these reasons it is contemplated that the chief utility of this invention will be found in rail and road transportation especially in local service and in urban districts wherein the slow acceleration of current equipment is a major limitation, and waste of power and rapid wear are encountered in repeated braking.

It will be seen that the "single lever control" feature may comprise a spring returned pedal, or a rocking pedal, or a rocking member with individual pedals at either end. Also, the shutting of the throttle when the flywheels are fully energized may be accompanied by completely stopping the engine if one of the known automatic starting devices be installed.

Referring now to the variable ratio transmission, the importance of having the contact loads at each contact always vary proportionately with the local instantaneous driving effort should be emphasized. In transmissions of the prior art wherein the torque responsive means has been applied to members having variable radius of contact, this relationship is upset. If, for example, the major radius is twice the minor, and the contact loads generated by the torque responsive device are adequate for the smaller radius of contact, then the loads in the major radius position will be twice as great as necessary, thus doubling the friction losses at that point. With the novel provisions of this invention this limitation is overcome. An associated feature resides in the disposition whereby the low gear, or high torque, contacts occur at the greater radii, whereby the capacity of a given size of transmission is increased over those examples in the prior art wherein certain of the members come to minimum radius of contact in the low gear condition.

Smooth hard steel rollers running under lubricated condition require very heavy contact loads to ensure against slippage, and it is an additional feature of this invention that these high loads are distributed over a relatively large number of roller contacts. Within given size, the present transmission affords at least three times the number of rollers; having high torque contacts of at least twice the radius, giving six times higher capacity at a given unit contact load than in certain of the types known in the prior art.

A further difficulty in variable ratio transmissions has been due to the backlash developed at the torque responsive devices under reversing torque, or over-run conditions, particularly where these devices are subject to axial displacement from the ratio changing movement. In the present case this problem is enhanced by the fact that when a rocker member such as the rollers 192 is moved from mid-position against a contacting face, the approaching end of the roller moves less than does the receding end, and these movements do not have a straight-line relationship. It will be seen that the hydraulic piston torque-responsive loading means of this invention comprise hydraulic ratchets (in virtue of their one-way valves) whereby the entire system is maintained at zero backlash under all conditions, and whereby the parts are hydraulically cushioned against shock under sudden reversals in torque. Under this condition all of the pistons merely attempt to reverse their direction of travel, whereupon those pistons which were on their inlet strokes instantly reverse their roles, in virtue of the automatic delivery valves which hydraulically restrain the pistons from inward movement, maintaining on the parts the full contact pressure due to the slope of the associated cams.

In addition to the special hydraulic anti-friction means for the thrust bearings which take the reactions of the heavy contact load, the bearing disposition is such that, in the low gear position, there is substantially zero load on the high speed thrust face 120, since the reactions are then concentrated on the reaction member 128, and the driven member thrust face 234 (which is then rotating at low speed). Similarly, in the high gear position, the driven member thrust 234 is relieved of all load, and there is zero relative motion at the high speed driving member thrust 120, so that these bearings have little or no friction losses towards either extreme of the ratio range throughout which the surface velocities decrease as the possible loads increase.

The novel hydraulic system of this invention also affords a delicate servo control wherein the effort expended by the operator in moving the single lever which comprises the entire speed control of the vehicle is reduced to a mere finger pressure.

For installations where weight and space are not at a premium the present invention might be practiced with large diameter and heavy flywheels directly connected. However, the geared up flywheels of the preferred embodiment have very great energy storage capacity compared to their bulk and weight. For instance, if the maximum flywheel rim speed be ten times the maximum desired vehicle speed, then by decelerating the flywheels in the ratio of one hundred forty-to-one hundred sufficient energy will be abstracted to accelerate the vehicle from rest to the desired speed using flywheels of only two percent of the gross weight of the vehicle. Current vehicle engine flywheels, running at engine speed, have such inconsiderable storage capacity as to represent a very small proportion of the total kinetic energy to be impressed upon the vehicle. It will be observed that such conventional flywheels are brought to rest within a few seconds of shutting off the engine by the mere frictional losses therein. Such loss is avoided in the present invention by the one-way drive whereby the flywheel runs independently of the engine whenever this is slowed down or stopped. In this connection it is mentioned that a flywheel of five times normal weight and geared up five-to-one will possess one hundred and twenty-five times the energy of the normal wheel. It should also be mentioned that the two flywheels of the preferred embodiment rotate in opposite directions in order to cancel out gyroscopic effects within the housing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a transmission, in combination, rollers mounted for planetization about an axis, three members concentric with said axis, said members having roller driving contacts subtending respectively large, small and adjustable radii from said axis, one said member comprising member parts hydraulically restrained against relative rotational creepage, and another said member being axially opposed to the other two.

2. In a transmission, in combination, planetary rollers, two members having rolling driving contacts with certain of said rollers subtending respectively large and small radii from the axis of planetization, said members each including relatively movable member parts and a pump means, the pump means, in each instance, being organized to resist relative movement of said member parts, and a third member having rolling contact with certain of said rollers adjustable to include said radii.

3. In a transmission, in combination, a roller mounted for planetization about an axis and rockable to radially shift its contact with a member to be driven, and means to drive said roller including a two-part drive member having hydraulic plungers on one said member part and plunger operating means on the other said member part, said member parts being organized for cumulative rotational creepage whilst said roller is being driven.

4. In a transmission, an annular disc, rollers rockably contacting said disc, members engaging near respective ends of said rollers and movable to shift the disc contact to be opposite either member or therebetween, and auxiliary means to rock the rollers beyond said oppositions.

5. In a transmission, the combination with rollers and an annular disc rockably related for shift of the contact point therebetween along the rollers and across the disc, of inner and outer members engaged with corresponding rollers, and means to effect relative motion between said members and said disc comprising hydraulic plungers organized to exert contact pressures proportional to the driving load on the associated member.

6. In a transmission, the combination with an inner and an outer drive ring member, of an annular disc member opposed to said rings, planet rollers drivably engaged between the opposed members, said disc and rollers being relatively rockable for shift of the driving contact therebetween, cam driving means for certain of said members, and plungers adapted to hydraulically take up relative motion of said members under said rocking action.

7. In a transmission, in combination, a pump having a body means and a rotary operating means organized for cumulative rotational creepage under hydraulic restraint, and a rolling contact drive member driven by reaction of the restraint on said operating means.

8. In a transmission, in combination, a composite rolling contact drive member having one part to be driven from another, and a pump having plungers hydraulically restrained against relative plunger movement and organized to effect said driving.

9. In a transmission, a rolling contact drive member, and a drive means for said member including a circumferential assemblage of cylinders, and plungers within said cylinders hydraulically restrained against relative plunger movement.

10. In a transmission, the combination with a rolling contact drive member, of a member driving cam, and plungers hydraulically restrained against relative plunger movement by said cam.

11. In a transmission, the combination with a rolling contact drive member, of a pump comprising a composite member driving means organized for cumulative rotational creepage, and means to control the rate of rotational creepage of the pump components.

12. In a transmission, the combination with a two-part rolling contact drive member, of hydraulic plungers on one said part, and plunger operating means on the other said part organized for cumulative rotational creepage between said parts.

13. In a transmission, the combination with rolling contact drive members, of hydraulic pumps comprising a driving coupling for respective members, and means to control the relative hydraulic pressures in said pumps.

14. In a transmission, in combination, a two-part rolling driving contact member comprising a drive member part having cylinders, a companion member part having inclined tracks, plungers constituting a driving connection between said member parts, said plungers being movable within said cylinders, and hydraulic means adapted to control the axial relation of said parts.

15. In a transmission, the combination with a two-part rolling driving contact member, of a driving and thrust means therebetween comprising a cam on one said part, cylinders in the other said part, cam-engaging plungers slidable in said cylinders, and hydraulic means for varying the mean position of said plungers.

16. The combination with a member to be driven and moved axially with respect to a companion member, of a cam on one member, hydraulic cylinders in the other member, plungers operatively engaging said cam and cylinders, and means resisting relative plunger movement.

17. In a transmission, a drive member comprising relatively movable parts, a fluid pressure pump organized to resist relative movement of said parts, a driven member, a reaction member comprising relatively movable parts, a fluid pressure pump organized to resist relative movement of said reaction member parts, and means engaging said members and rockable with respect thereto to effect a ratio change.

18. In a transmission, a drive member having oppositely inclined cam tracks and a plurality of plungers, part of said plurality of plungers engaging one incline and part another, and a second member drivably contacted with the first said member by means of said cam and plunger.

19. In a transmission, in combination, a rolling driving contact member adapted to be contact loaded, a cam on said member, and a pump plunger comprising a driving and contact loading means for said member.

20. In a transmission, a driving and loading means therefor including members adapted to be loaded into rolling driving contact against slippage, said driving and loading means comprising hydraulic plungers, a circumferentially continuous plunger operating cam, and valve means organized to resist inward movement of said plungers.

21. In a transmission, in combination, a rolling-contact drive member, concentric cams thereon oppositely inclined but facing the same way, a plurality of hydraulic plungers in rolling engagement with said cams, and a primary hydraulic pressure means maintaining said engagement.

22. In a transmission, in combination, a rolling contact drive member comprising member parts organized for cumulative relative rotational creepage, cylinders in one said part, plungers reciprocable in said cylinders, and an endless cam means on the other said part engaging said plungers to comprise a torque responsive loading means.

23. In a transmission, in combination, a rolling-contact drive member and contact loading and shifting means therefor including hydraulic plungers, a plunger operating cam, and means to supply make-up hydraulic fluid to said plungers.

24. In a transmission, in combination, a rolling-contact drive member, and a hydraulic loading and driving means for said member comprising cylinders, each said cylinder having formed in its wall a duct, plungers in said cylinders, and valves limiting hydraulic flow in said ducts to one direction only.

25. In a transmission, in combination, a two-part rolling-contact drive member including a member part having a cam, a companion member part having cylinders, plungers drivably connecting said cam and cylinders for rotational and axial movement therebetween, means to hydraulically follow up each plunger out-stroke, and means to hydraulically resist each plunger in-stroke.

26. In a transmission, in combination, a rolling-contact drive member having inclined tracks, a companion member having cylinders, plungers drivably connecting said members, a primary fluid pressure means adapted to maintain said plungers in contact with said tracks, and means to prevent escape of fluid from said cylinders.

27. In a transmission, in combination, a rolling-contact drive member, means to drive said member including an undulating cam, a member having a plurality of cylinders, plungers in said cylinders engaging said cam, and means for supplying primary hydraulic pressure to said plungers to follow up any bodily motion of said cam.

28. In a transmission, in combination, a rolling-contact drive member including inner and outer cam tracks comprising a torque-responsive loading means, and means to automatically take up backlash in said loading means comprising hydraulic plungers against which said cams abut, cylinders for said plungers, hydraulic fluid means adapted to follow up any outward plunger movement, and means to oppose escape of fluid from said cylinders.

29. In a transmission, in combination, a drive member, a pump comprising a member driving means, and thrust bearing means lubricated by fluid pressure and subject to mechanical pressure developed by said pump.

30. In a transmission, a pump having a restricted delivery system whereby the pump comprises a driving coupling, and a bearing subject to mechanical thrust from the pump and hydraulically connected to form a part of said restricted delivery.

31. The combination with a pump generating proportional mechanical and fluid pressures, of a thrust bearing organized to be subject to both said pressures, said pump being hydraulically restrained to slow rotational creepage by a restricted delivery system with which said bearing is in open communication, the area of said bearing subject to fluid pressure being just insufficient to cause complete separation of its parts whereby said bearing cooperates in said hydraulic restraint.

32. In a transmission, the combination with a drive member, of a cam, plungers drivably engaging said cam to generate hydraulic fluid pressure proportional to the driving load, thrust means, and means to conduct fluid to said thrust means under the pressure so generated.

33. In a transmission, in combination, a drive member subject to varying torque, a driving shaft organized for rotational creepage relative to said member, a hydraulically restrained pump comprising a driving connection between said shaft and said member, a thrust means associated with said member, and means to conduct fluid under the pressure so generated to said thrust means.

34. The combination with a pump having a restricted delivery passage hydraulically restraining the pump to slow rotational creepage, of a thrust bearing subject to mechanical thrust reaction from said pump and connected to said passage so as to be lubricated by fluid pressure from said pump.

35. The combination with a cam-operated plunger loaded by fluid under pressure and members having sliding bearing surfaces subject to said load, of means to conduct said fluid under pressure to said surfaces for lubrication thereof.

36. In a transmission, in combination, drive members, fluid pressure means organized to contact load said members responsively to the torque transmitted, and bearings subject to said load and lubricated from said pressure.

37. Means to proportion the pressure in two hydraulic systems comprising, in combination, pressure control valves in the respective systems, a balance beam restraining said valves, and a fulcrum for said beam movable from one valve to the other.

38. In a transmission, in combination, two hydraulic systems organized to effect a ratio change, a pressure control valve in each system, a balance beam restraining said valves, and a fulcrum for said beam movable to proportion the pressure relation between said systems.

39. In a transmission, in combination, separate drive means each comprising parts organized for relative rotational creepage, hydraulic systems associated with the respective drive means each including a pump resisting said creepage, a thrust means subject to pump pressure, and means to control the relative pressures in said systems.

40. In a transmission, in combination, rotatable drive members, hydraulic systems adapted to effect ratio changing movement of said members, control means including pressure relief plungers in each system, a balance beam restraining said plungers, and a movable fulcrum for said beam.

41. In a transmission, ratio control systems including, in combination, drive members, pumps comprising driving connections for said members, thrust means subject to pressure from the respective pumps, and means to control the relation between the pressures existing in the respective systems.

42. In a transmission, in combination, a primary pump adapted to induce hydraulic pressure, a rolling driving contact member including plungers hydraulically restrained against inward movement by hydraulic pressure, cylinders for said plungers, a cam means with which said plungers are adapted to engage and by means of which contact pressure is established, and a non-return inlet valve for each cylinder adapted to follow up any outward plunger movement.

ROLAND CHILTON.